United States Patent

Yang

Patent Number: 5,804,072
Date of Patent: Sep. 8, 1998

[54] WATER FILTER WITH STRAINER SCRAPING MEANS

[76] Inventor: Chi-Hua Yang, No. 13, Feng Gong Road, Taichung City, Taiwan

[21] Appl. No.: 939,686

[22] Filed: Sep. 29, 1997

[51] Int. Cl.$^6$ ................................................ B01D 29/64
[52] U.S. Cl. .......................... 210/411; 210/413; 210/106; 210/108; 210/111; 210/136
[58] Field of Search ..................................... 210/413, 106, 210/108, 411, 111, 136; 100/112, 116

[56] References Cited

U.S. PATENT DOCUMENTS

| | | |
|---|---|---|
| 5,106,500 | 4/1992 | Hembree . |
| 5,164,079 | 11/1992 | Klein . |
| 5,198,111 | 3/1993 | Davis . |
| 5,202,019 | 4/1993 | Skogland . |
| 5,364,539 | 11/1994 | Castagno . |
| 5,527,462 | 6/1996 | Davis . |
| 5,569,383 | 10/1996 | Vander Ark . |

FOREIGN PATENT DOCUMENTS 1493289  2/1987  U.S.S.R. .

Primary Examiner—Thomas M. Lithgow
Attorney, Agent, or Firm—Beveridge, DeGrandi, Weilacher & Young LLP

[57] ABSTRACT

A water filter having a strainer mounted on the inside for straining water, and a reciprocating device controlled by a pressure differential controller to reciprocate a disk-like scraper in the strainer, causing it to scrape out dirt from the strainer, the disk-like scraper having a center water hole and a check valve mounted in the center water hole for permitting water to flow downwards in the strainer through the center water hole and stopping water from flowing upwards in the strainer through the center water hole.

1 Claim, 5 Drawing Sheets

WATER FILTER WITH STRAINER SCRAPING MEANS

BACKGROUND OF THE INVENTION

The present invention relates to water filters for straining water by a strainer, and more particularly to such a water filer which comprises a disk-like scraper controlled by a pressure differential controller to scrape out dirt from the strainer.

FIG. 1 shows an industrial water filter according to the prior art. This structure of water filter comprises a housing 10, a strainer 11, a suction scanner 12, a motor 13, a drain valve 14, a pressure differential switch 15, a water intake valve 16, and a water outlet valve 17. When a pressure drop is detected by the pressure differential switch 15, the pressure differential switch 15 immediately provides a signal to start a reverse washing operation. The reverse washing operation includes two washing procedures, namely the primary washing procedure and the fine washing procedure. During the fine washing procedure, the motor 13 is driven to propel the suction scanner 12 in the strainer 11. When the drain valve 14 is opened, a suction force is induced to suck in dirt from the strainer 11. At the same time, clean water is pumped into the housing 10 by an external water pumping device for washing. During the primary washing procedure, a stainless steel brush device is driven by a motor to remove dirt from the strainer 11, permitting waste matter to be carried with water out of the housing 10 through the drain valve 14. The main drawback of this structure of water filter is its complicated washing procedures. Washing the strainer takes too much time.

SUMMARY OF THE INVENTION

According to the preferred embodiment of the present invention, the water filter comprises a housing, a strainer mounted inside the housing and defining the inside space of the housing into an inner water chamber and an outer water chamber around the inner water chamber, a water intake valve adapted for guiding water into the housing, a water outlet adapted for guiding filtered water out of the housing, and a drain valve connected to the housing at a bottom side and adapted for carrying off waste water from the housing, wherein a reciprocating device is mounted on the housing at a top side and controlled by a pressure differential controller to reciprocate a disk-like scraper in the inner water chamber along an inside wall of the strainer, causing it to scrape out dirt from the strainer, the disk-like scraper comprising a center water hole, and a check valve mounted in the center water hole for permitting water to flow downwards in the inner water chamber through the center water hole and stopping water from flowing upwards in the inner water chamber through the center water hole.

DETAILED DESCRIPTION OF THE PREFERRED EMBODIMENT

Figure 1:
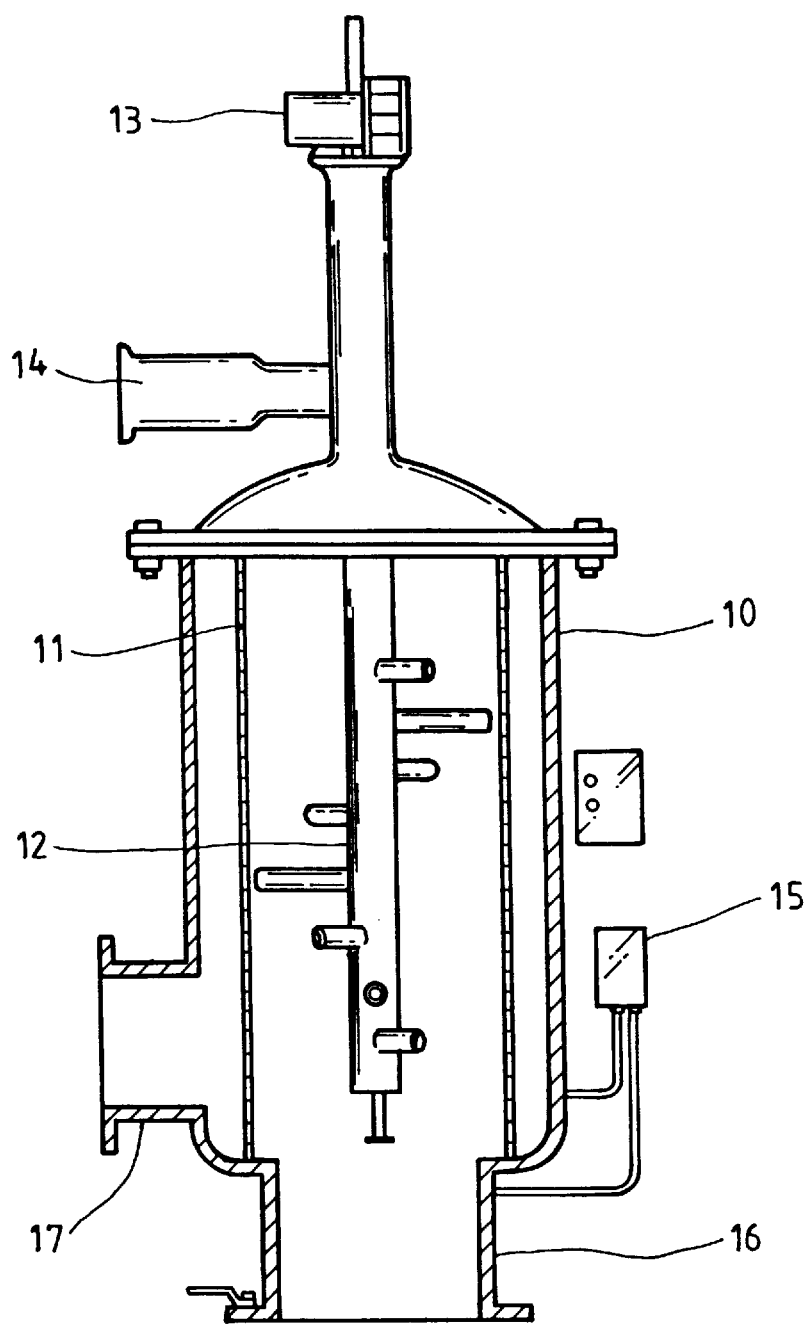
FIG. 1 is a sectional view of a water filter according to the prior art.
Figure 2:
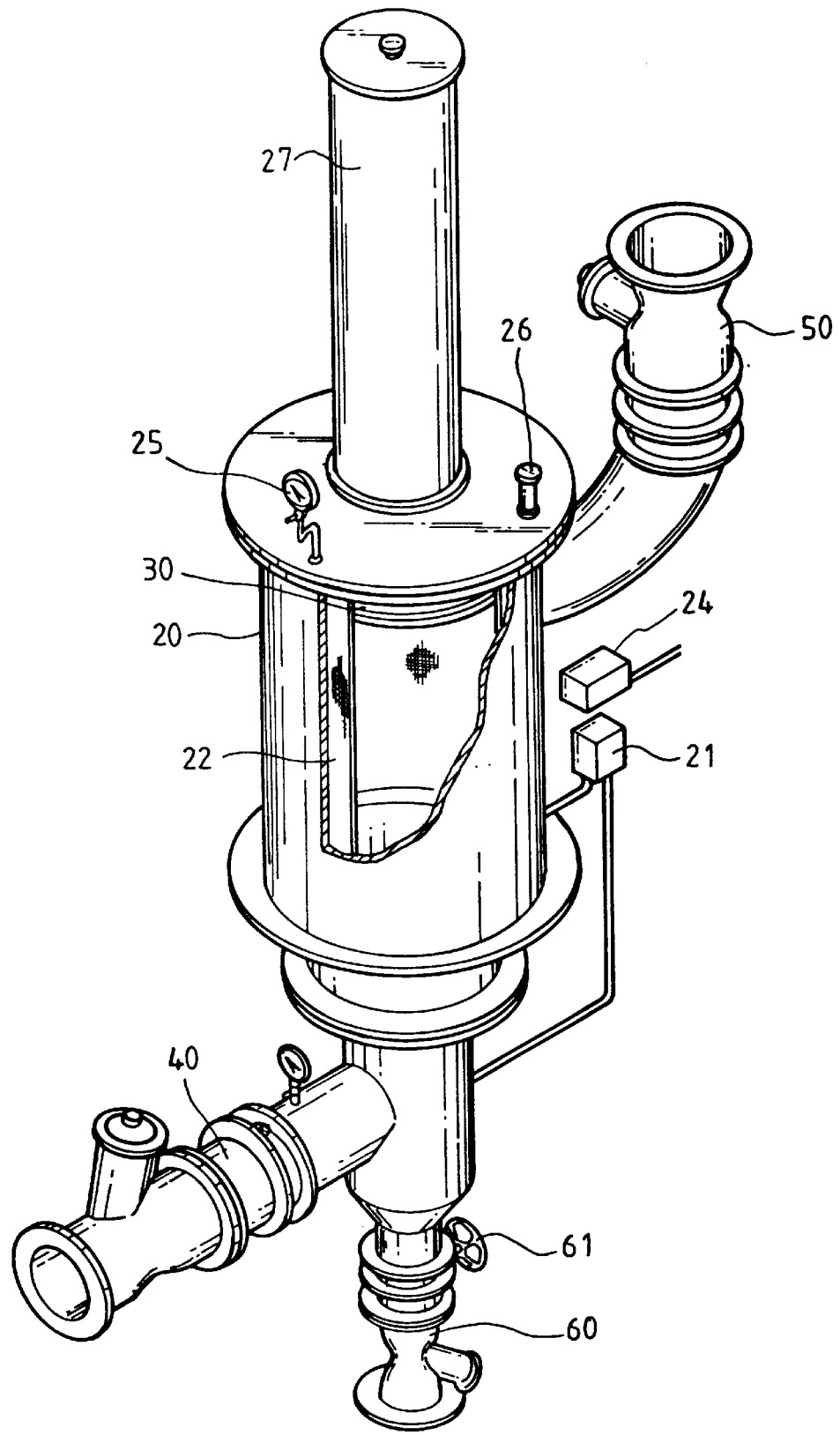
FIG. 2 is a cutaway of a water filter according to the present invention.
Figure 3:
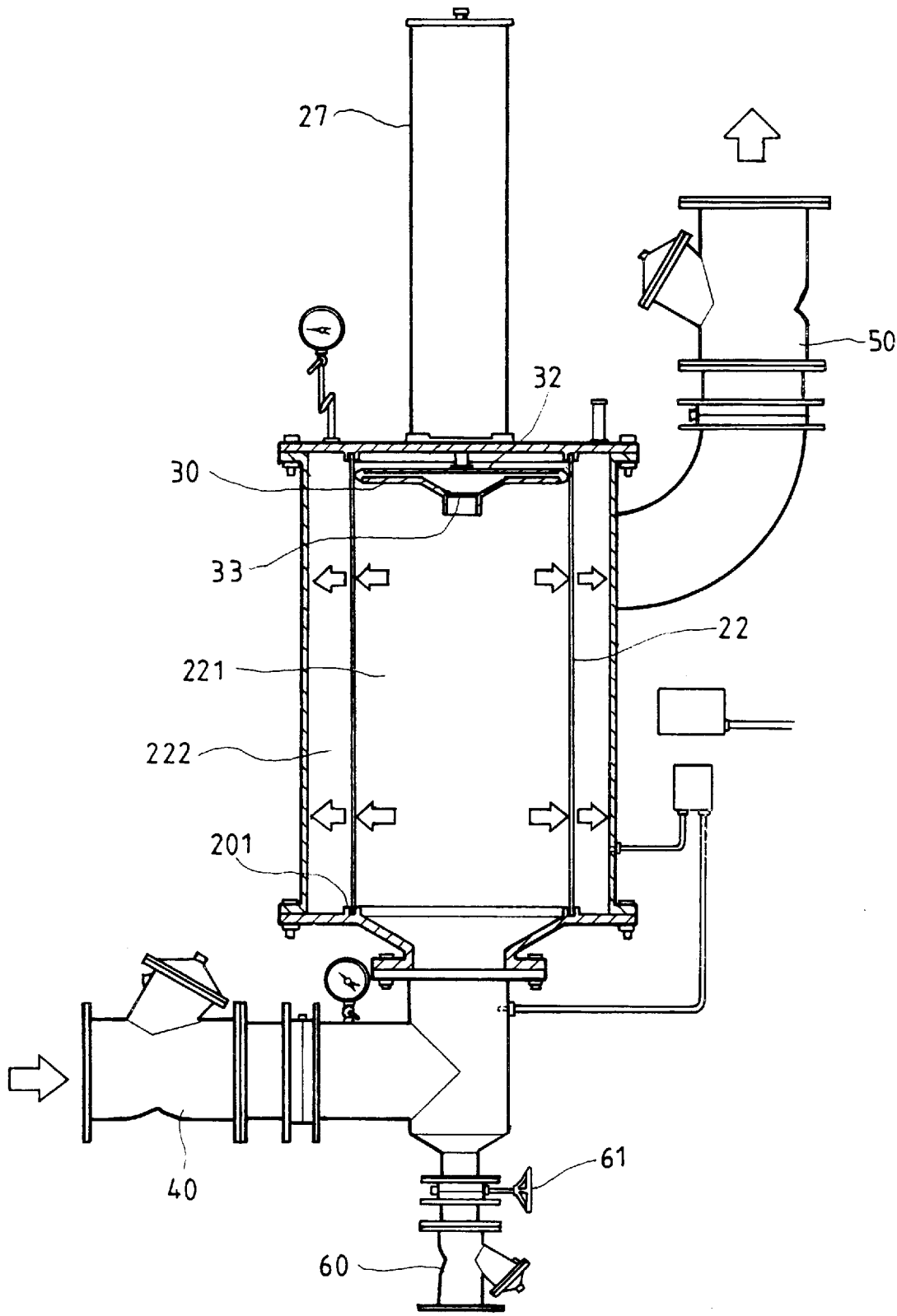
FIG. 3 is a longitudinal view in section of the water filter shown in FIG. 2.
Figure 4A:
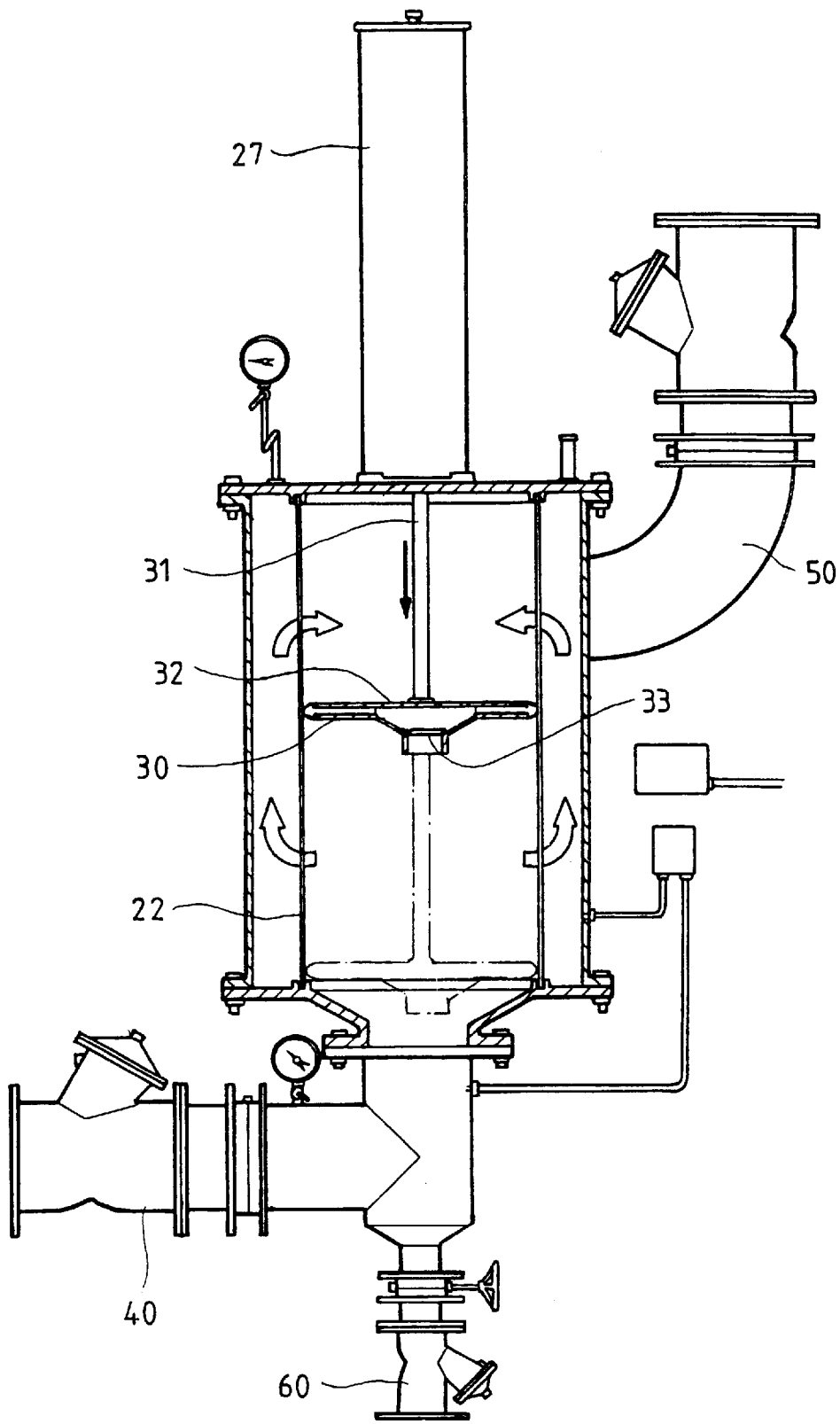
FIG. 4A is a sectional view of the present invention, showing the disk-like scraper lowered in the inner water chamber along the inside wall of the strainer.

Referring to FIGS. 2, 3 and 4A, a water filter in accordance with the present invention comprises a cylindrical housing 20, a pressure differential controller 21, a strainer 22 mounted within the housing 20, a valve control switch 24, a pressure gage 25 connected to the housing 20 and adapted to measure the inside pressure of the housing 20, a relief valve 26, a reciprocating device 27 mounted on the top side of the housing 20 at the top in a vertical position, a water intake valve 40 connected to the housing 20 near its bottom side and controlled to let water flow into the housing 20, a water outlet valve 50 connected to the housing 20 near its top side and controlled to let filtered clean water flow out of the housing 20, and a drain valve 60 mounted on the bottom side of the housing 20 and controlled by a regulator 61 to drain waste water from the housing 20. The strainer 22 is mounted on an annular seat 201 inside the housing 20 in a vertical position, and divides the inside space of the housing 20 into an inner water chamber 221 and an outer water chamber 222. The pressure differential controller 21 has one end connected to the housing 20 outside the strainer 22, and an opposite end connected to the water intake valve 40. A disk-like scraper 30 is moved up and down in the inner water chamber 221 along the inside wall of the strainer 22. A vertical reciprocating rod 31 is coupled between the disk-like water stopper 30 and the reciprocating device 27, and controlled by the reciprocating device 27 to reciprocate the disk-like scraper 30 in the strainer 22. The disk-like scraper 30 has an annular water hole 32 at the center. A check valve 33 is mounted in the annular water hole 32 of the disk-like scraper 30 to let water flow downwards through the annular water hole 32 and to stop water from flowing upwards through the annular water hole 32.

Referring to FIG. 3 again, when water is pumped into the water intake valve 40, it flows into the inner water chamber 221 within the strainer 22, then flows through the strainer 22 to the outer water chamber 222, and then flows out of the housing 20 through the water outlet valve 50. When water flows from the inner water chamber 221 through the strainer 22 to the outer water chamber 222, a pressure drop is caused to occur, and the pressure drop is enhanced with the deposition of sediment in water in the inner water chamber 221. When the pressure drop reaches a predetermined value, the pressure differential controller 21 is induced to start the reciprocating device 27 and simultaneously to close the water intake valve 40 and the water outlet valve 50.

Figure 4B:
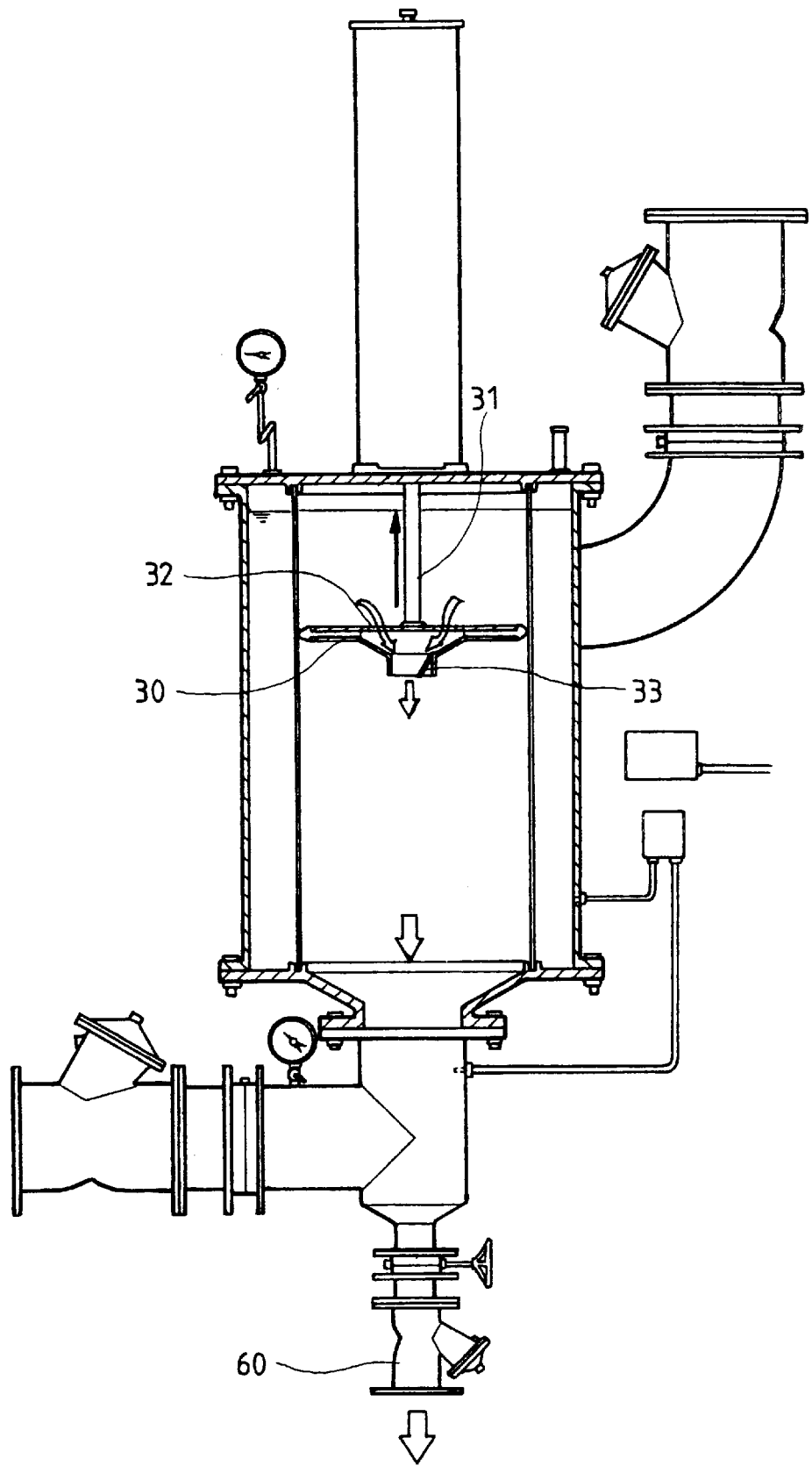
FIG. 4B is similar to FIG. 4A but showing the disk-like scraper lifted.

Referring to FIGS. 4A and 4B, when the reciprocating device 27 is started and the water intake valve 40 and water outlet valve 50 are closed, the disk-like scraper 30 is moved downwards along the inside wall of the strainer 22 to scrape out dirt. When the disk-like scraper 30 is moved to the lower limit, water is forced to flow in a rush from the outer water chamber 222 through the strainer 22 into the inner water chamber 221 above the disk-like scraper 30, causing the strainer 22 to be washed, and then the disk-like scraper 30 is lifted to its former upper limit position. When the disk-like scraper 30 is lifted, water is forced to flow downwards in the inner water chamber 221 through the water hole 32 of the disk-like scraper 30. After washing, waste water is carried away from the housing 20 through the drain valve 60.

While only one embodiment of the present invention has been shown and described, it will be understood that various modifications and changes could be made thereunto without departing from the spirit and scope of the invention disclosed.

What the invention claimed is:

1. A water filter comprising a housing, a strainer mounted inside said housing and defining said housing into an inner water chamber and an outer water chamber around said inner water chamber, a water intake valve adapted for guiding water into said housing, a water outlet adapted for guiding filtered water out of said housing, and a drain valve connected to said housing at a bottom side and adapted for carrying off waste water from said housing, wherein a reciprocating device is mounted on said housing at a top side and controlled by a pressure differential controller to reciprocate a disk-like scraper in said inner water chamber along an inside wall of said strainer, causing it to scrape out dirt from said strainer, said disk-like scraper comprising a center water hole, and a check valve mounted in said center water hole for permitting water to flow downwards in said inner water chamber through said center water hole and stopping water from flowing upwards in said inner water chamber through said center water hole.

* * * * *